United States Patent [19]

Ikeda et al.

[11] Patent Number: 4,700,441
[45] Date of Patent: Oct. 20, 1987

[54] TAPPING MACHINE

[75] Inventors: Hidekatsu Ikeda, Hatano; Hiroyuki Morikawa, Kanagawa; Yasunori Yoshie, Yokohama, all of Japan

[73] Assignee: Amada Company, Limited, Japan

[21] Appl. No.: 786,066

[22] Filed: Oct. 10, 1985

[30] Foreign Application Priority Data

Oct. 12, 1984 [JP] Japan ............................... 59-212571

[51] Int. Cl.[4] ........................................... B23P 23/04
[52] U.S. Cl. .................... 29/33 P; 10/130 R; 29/33 R; 72/335; 83/549
[58] Field of Search ................ 83/549, 215; 10/86 R, 10/128, 130 R; 408/30, 41, 53, 24, 25; 72/327, 335, 333, 340, 341; 29/33 P, 33 R

[56] References Cited

U.S. PATENT DOCUMENTS

| | | | |
|---|---|---|---|
| 2,371,440 | 3/1945 | Hall | 10/86 R |
| 2,458,740 | 1/1949 | Schafer | 10/130 X |
| 3,113,329 | 12/1963 | Andres et al. | 10/130 X |
| 3,412,593 | 11/1968 | Price | 72/335 |
| 3,483,904 | 12/1969 | Jacumin | 408/25 X |
| 3,682,560 | 8/1972 | Suizu | 408/53 X |
| 3,822,958 | 7/1974 | Lewis | 408/53 X |
| 3,832,083 | 8/1974 | Dockery et al. | 408/24 |
| 4,024,593 | 5/1977 | Pendell | 10/86 R |
| 4,502,823 | 3/1985 | Wronski et al. | 408/6 X |
| 4,532,843 | 8/1985 | Miyama | 83/549 X |

FOREIGN PATENT DOCUMENTS

1502721 1/1970 Fed. Rep. of Germany ........ 83/549

*Primary Examiner*—Frank T. Yost
*Attorney, Agent, or Firm*—Wigman & Cohen

[57] ABSTRACT

A tapping machine has a plurality of punches for punching a plate-shaped workpiece and extruding or plunging the punched holes and a plurality of tapping units for carrying out the tapping operation continuously in the tapping machine. A free positional workpiece transfer-and-position device is provided which moves the plate-shaped workpiece in the longitudinal and transverse directions of the work area of the machine. The plurality of punches are provided in the direction transverse to the longitudinal direction of the machine. First operating means provide an operating force for the tapping units and second operating means provide an operating force for the punches.

12 Claims, 4 Drawing Figures

TAPPING MACHINE

BACKGROUND OF THE INVENTION

1. Field of the Invention

The present invention relates to a tapping machine for performing a tapping operation on a workpiece in plate form, and, more specifically, to a tapping machine wherein, after a tapping hole is formed or a deforming or plunging operation is performed on a workpiece, the tapping machine carries out the tapping operation continuously.

2. Description of the Prior Art

When a thin workpiece is to be worked or tapped, it is necessary to deform the workpiece at the spot to be tapped in order to make the material of the spot thick so that the number of threads to be formed on an inner wall of the tapping hole may be increased, thereby obtaining a firm connection between the tapping hole and bolt threaded therein. Such an operation is known as a deforming or plunging operation.

Conventionally, in performing a tapping operation on a plate workpiece, a system is commonly used by which the forming of the tapping hole or the deforming or plunging operation is first performed by means of a punch press, after which the workpiece is moved to the tapping machine and the tapping is performed while the workpiece is being positioned manually. Accordingly, the processing efficiency is poor in such a conventional operation, and there is the problem that part of the operation is unnecessary.

Accordingly, the configuration is being developed by which the tapping unit is attached to the punch press to perform the tapping operation continuously after the forming of the tapping hole or the deforming or plunging operation is carried out. As examples of configurations by which the tapping unit is attached to the punch press, there is the configuration by which the driving source of the ram on the punch press drives the tapping unit, and the configuration by which a tapping unit provided with its own drive source is attached to the punch press.

In the configuration in which the driving source of the ram on the punch press drives the tapping unit, the control of the rotational linkage and vertical movement of the taps is extremely difficult because the rotation and vertical movement of the taps on the tap unit originate from the vertical movement of the punch press ram. Because it is difficult to interrupt the linkage of the vertical movement of the punch press ram with the rotation etc. of the taps on the tapping unit, when a plurality of tapping units is provided, these tapping units all operate simultaneously. Accordingly, it is difficult to provide tapping units with taps of different diameters. In addition, in the case where the pitch and diameter of the taps is changed, there is the problem that the operation to make this change can be extremely dangerous.

In the configuration in which a tapping unit provided with its own drive source is attached to the punch press, when a plurality of tap types is used in performing the tapping operation, it is necessary to have a tapping unit for each size of tap, which results in high cost. In addition, because each tapping unit is provided with its own drive source, each tapping unit is large in size, and the problem arises that the space for accomodating the punch press must be very large.

SUMMARY OF THE INVENTION

One object of the present invention is to provide, with the consideration to the drawbacks of such conventional devices, a solution to the above-mentioned problems by the provision of a tapping machine wherein the tapping operation is carried out continuously after the forming of the tapping hole or the deforming or plunging operation is performed on a plate-shaped workpiece.

A second object of the present invention is to provide a tapping machine in which processing taps in different sizes can easily be performed and in which the tapping operation is carried out at the optimum rate of rotation conforming to the diameter of the tap when the forming of the tapping hole or the plunging process is being performed.

A third object of the present invention is to provide a tapping machine in which there is a plurality of tapping units which can be driven through a common drive motor, and in which the individual tapping units can be separately operated.

In order to accomplish these objects of the present invention, a freely positional workpiece transfer-and-positioning device is provided which moves a plate-shaped workpiece in the longitudinal and transverse directions within a throat section formed between an upper and a lower frame. A plurality of punches are positionally provided in the direction transverse to the longitudinal direction of the upper frame on an upper tool support member secured to the forward edge of the upper frame. A striker which is removably supported on the upper frame above the punch is provided in a freely positionable manner on the upper position of each punch to apply the operating force to each punch. On the front edge of the lower frame, a plurality of dies are mounted, corresponding to each of the punches. Furthermore, a plurality of tapping units are provided on the upper frame, driven by means of a common drive source, from which only the necessary taps are selected and operated.

BRIEF DESCRIPTION OF THE DRAWINGS

These and other objects, features and advantages of the present invention will become more apparent from the following description of preferred embodiments taken in conjunction with the accompanying drawings, in which.

DESCRIPTION OF THE PREFERRED EMBODIMENT

Following is a description of the preferred embodiment of the present invention, with reference to the drawings.

Figure 1:
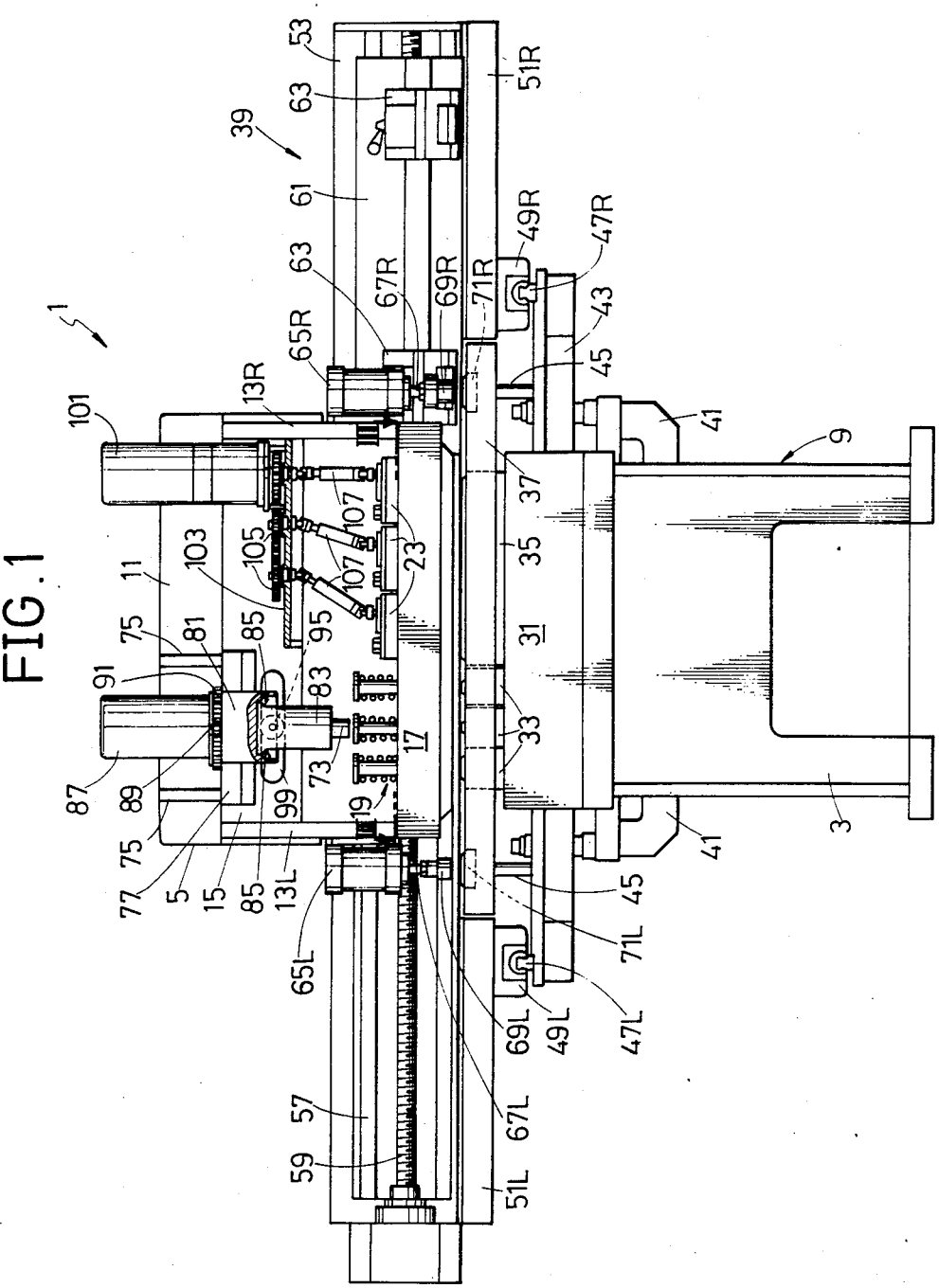
FIG. 1 is a front elevational view of a tapping machine incorporatiing one embodiment of the present invention.
Figure 2:
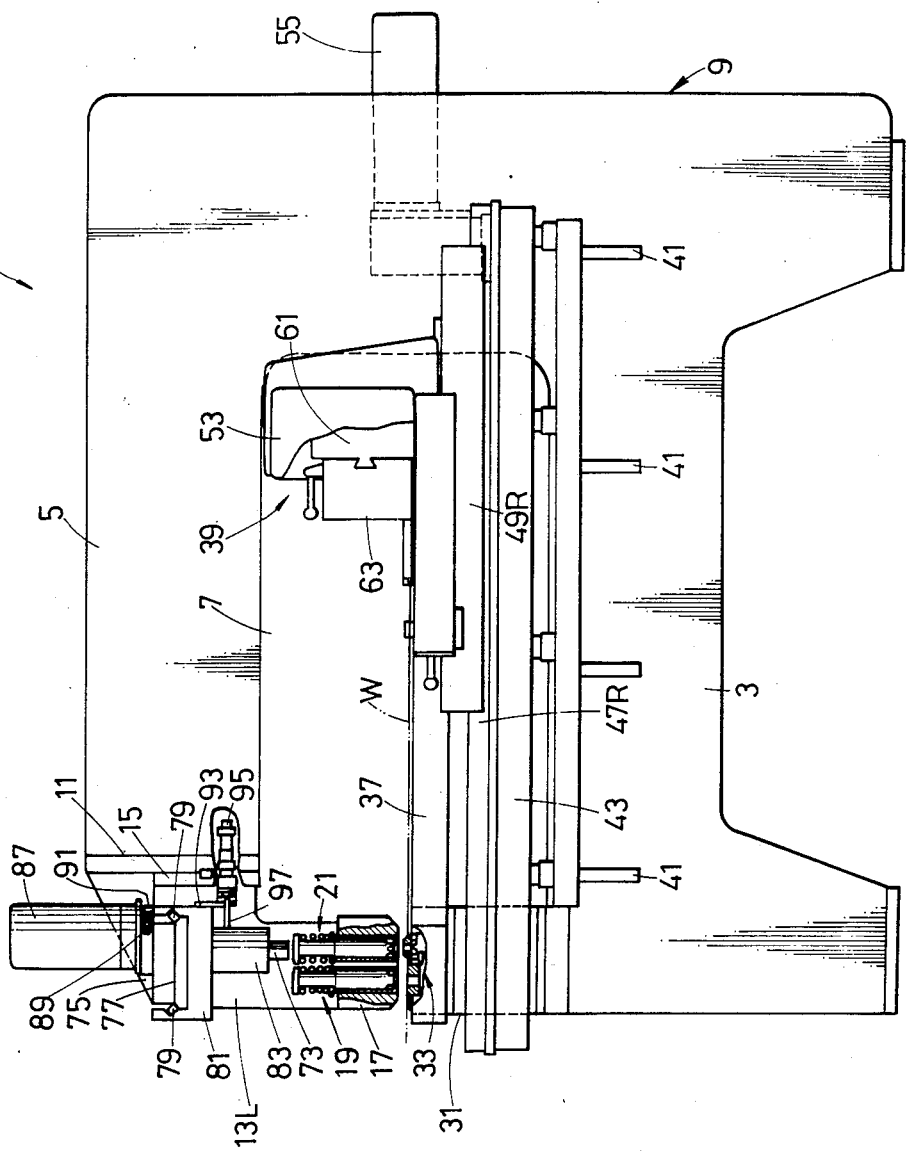
FIG. 2 is a right side elevational view of the tapping machine of FIG. 1 with one part cut away.

Now referring to FIG. 1 and FIG. 2, a tapping machine 1 comprises a lower frame 3 and an upper frame 5 which is provided above the lower frame 3 to form a throat section 7 therebetween, thereby forming a C-shaped frame 9. A perpendicular mounting plate 11 is installed on the front edge of the upper frame 5. A face plate 15 provided with a right side plate 13R and a left side plate 13L, both of which are formed in the shape of an inverted L, is integrally mounted on the front surface of the mounting plate 11. Mounted horizontally on the lower edges of these right and left side plates 13R and 13L is an upper tool support member 17 which extends in the left-right direction transverse to the longitudinal direction of the upper frame 5. Formed in this upper tool support member 17 are a plurality of mounting holes to removably mount a plurality of punch units 19 for forming the tapping hole, a plurality of punch units 21 for deforming or plunging, and a plurality of tapping units 23. These punch units 19 and 21 are conventionally constructed, therefore a detailed explanation for them will be omitted here.

Figure 3:
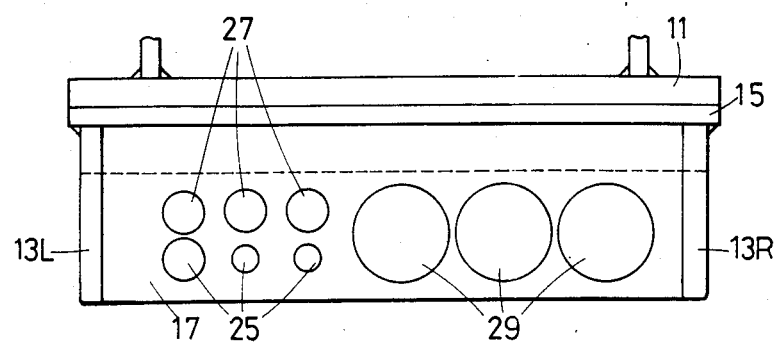
FIG. 3 is an expanded sectional view of the tapping machine of FIG. 1 viewed along line III—III.

As shown in more detail in FIG. 3, a plurality of punch unit mounting holes 25 for mounting the tapping hole process punch units 19, and a plurality of punch unit mounting holes 27 for mounting the deforming or plunging punch units 21, are provided on one side of the upper tool support member 17, in parallel, in the forward and rear direction transverse to the longitudinal direction of the upper tool support member 17. A plurality of unit mounting holes 29, for mounting the tapping units 23, are arranged in the longitudinal direction of the upper tool support member 17 beside the punch unit mounting holes 25 and 27. As shown in FIG. 3, punch unit mounting holes 25, 27, and tapping unit mounting holes 29 have three different diameters, a small diameter, a middle diameter, and a larger diameter, respectively. The punch unit mounting holes 25 of the small diameter are used to fixed a plurality of drills for drilling small diameter holes in the workpiece. Punch unit mounting holes 27, having holes in the workpiece. Punch unit mounting holes 27, having holes of a middle diameter, are used to fix a plurality of punching tools to be plunged into the small holes in order to deform the marginal material around the small holes. Tapping unit mounting holes 29, having holes of the large diameter, are used to fix a plurality of tapping tools which tap threads into the deformed material.

A bolster 31 is installed on the front edge of the lower frame 3. A plurality of die units 33 are mounted on the bolster 31 corresponding to the punch units 19 for forming the tapping hole and the punch units 21 for deforming or plunging. These die units 33 are conventionally constructed, and therefore a detailed explanation for them will be omitted here. In addition, a support block 35 for supporting a workpiece W corresponding to the tapping units 23 is installed on the bolster 31.

Again referring to FIG. 1 and FIG. 2, a fixed table 37 for supporting a plate-shaped workpiece W to be processed, and a workpiece transfer-and-positioning device 39, for moving and positioning the workpiece W in the forward-rear and left-right directions, are provided on the upper section of the lower frame 3.

In more detail, a subframe 43 is supported horizontally by a plurality of support brackets 41 mounted on both the right and left side sections of the lower frame 3. The fixed table 37 is removably supported horizontally on this subframe 43 through a plurality of supporting members 45. A right guide rail 47R and a left guide rail 47L, which extend in the front-rear direction, are mounted on the right and left sides of the subframe 43. A right transfer table 51R and a left transfer table 51L are supported by the rails 47R and 47L through a slide block 49R and a slide block 49L in a manner that the tables 51R and 51L are freely movable in the forward-background direction. The right and left transfer tables 51R and 51L are integrally linked by a carriage base 53 which extends in the left-right direction. A detailed drawing of the carriage base 53 has been omitted here. However, the carriage base 53 is movable in a reciprocating manner in the front-rear direction by means of a first servo motor 55 and a ball screw mechanism mounted on the C-shaped frame 9.

A guide member 57, which extends in the left-right direction, and a ballscrew 59 are mounted on the carriage base 53, together with a second servo-motor (omitted from the drawing) for rotating the ball screw 59. A carriage 61 is removably supported on the guide member 57 in a manner that allows it to move freely in the left-right direction. A ball nut (omitted from the drawing) is secured to the carriage 61 and engages the ball screw 59. A plurality of conventional work clamps 63, for clamping the end edge section of the workpiece W to the carriage 61, are mounted so that their positions are freely and mutually adjustable both toward and away from each other.

By means of this configuration, when suitably driving and controlling the first servo-motor 55, the carriage base 53 and the right and left transfer tables 51R and 51L run along the guide rails 47R and 47L, and move suitably in the front-rear direction. In addition, the carriage base 61, suitably driving and controlling the second servo-motor, runs along the guide member 57, and moves suitably in the left-right direction, so that the workpiece W clamped by a clamp means is able to move in the front-rear and left-right directions. Accordingly, the workpiece W can be positioned for processing with reference to the processing positions of the punch units 19 and 21 and the tapping units 23.

Once again referring to FIG. 1, a plurality of pressure cylinders 65R and 65L on the right and left side sections of the upper frame 5 freely secure the workpiece W to the fixed table 37 by pressure. A plurality of pressure pads 69R and 69L are respectively mounted on a plurality of piston rods 67R and 67L at the lower ends thereof, which are provided in a freely and vertically movable manner on the pressure cylinders 65R and 65L. In addition, a plurality of supporting pads 71R and 71L are mounted on the fixed table 37 corresponding to the pressure pads 69R and 69L.

By this configuration, even in the case where the length of the workpiece W in the left-right direction is greater than the stroke length of the carriage 61 in the left-right direction, the processing of the workpiece W is carried out over its entire surface. Specifically, one or both of the pressure cylinders 65R and 65L are appropriately activated, so that the workpiece W is secured by pressure on the supporting pads 71R and 71L by the work clamp 63. In this condition, the entire surface of the workpiece W can be positioned at the processing positions of the punch units 19 and 21 and of the tapping unit 23 by adjusting the clamp position of the workpiece W by the clamp 63.

The desired unit of the punch units 19 and 21 mounted on the punch-mounting holes 25 and 27 of the upper tool support member 17 is selected for punching with a striker 73, which is provided in a freely movable manner, positionable in the left-right and front-rear directions above the punch units 19 and 21. To explain in more detail, a guide plate 77 which is integrally supported on the mounting plate 11 through a plurality of brackets 75 is arranged above the punch units 19 and 21.

On this guide plate 77, through a plurality of supporting rollers 79, a slide 81 is supported with free mobility in the longitudinal direction of the upper tool support member 17. Furthermore, a striker activating device 83, which is provided with the vertically movable striker 73 at its lower edge section, is supported on the slide 81 through a supporting roller 85 such that the device 83 is freely movable in the front-rear direction, transverse to the direction of movement of the slide 81. This striker activating device 83 can be, for example, a hydraulic cylinder, and the striker 73 can be its piston rod.

A drive motor 87, such as a servo-motor, is mounted on the upper surface of the guide plate 77 to move the striker 81 in the left-right direction along the guide plate 77. A pinion 89 mounted on the output shaft of this drive motor 87 engages with a rack 91 which is mounted in the left-right direction on the slide 81. In addition, a piston rod 97 of a front-rear positioning cylinder 95 mounted on the slide 81 through a bracket 93, is connected to the striker activating device 83 to move the striker activating device 83 in the forward-rear direction. The front-rear positioning cylinder 95 is positioned in a slot 99 which is formed in the left-right direction in the mounting plate 11 and face plate 15.

By means of this configuration, it is possible to move the slide 81 along the guide plate 77 in the left-right direction by suitably activating the drive motor 87.

In addition, it is possible to move the striker 73 in the front-rear direction through the striker activating device 83 by suitably activating the front-rear positioning cylinder 95. Accordingly, it is possible to position the striker 73 above an optional punch unit by suitably controlling the drive motor 87 and the front-rear positioning cylinder 95. After positioning the striker 73, it is possible to activate the optional punch with the striker 73 by activating the striker activating device 83.

A tap drive motor 101, which can be a servo-motor, is mounted on the face plate 15 for activating the tapping units 23 mounted in the unit mounting holes 29 in the upper tool support member 17. To explain in more detail, as illustrated in FIG. 1, the tap drive motor 101 is supported on a gear support plate 103 which is mounted horizontally on the face plate 15. A plurality of mutually engaged drive gears 105 are rotatably supported on the gear support plate 103, and one suitable drive gear is suitably connected by gearing to the tap drive motor 101. These drive gears 105 and the tapping units 23 are respectively associated with each other through a plurality of universal joints 107.

By this configuration, the tapping units 23 are simultaneously activated through the drive gears 105 and the universal joints 107 by the tap drive motor 101. Furthermore, even though all the tapping units 23 are activated simultaneously and in common by the tap drive motor 101, as will be explained in detail later, each tapping unit 23 is constructed to be able to individually carry out the tapping operation for the plate-shaped workpiece W.

Figure 4:
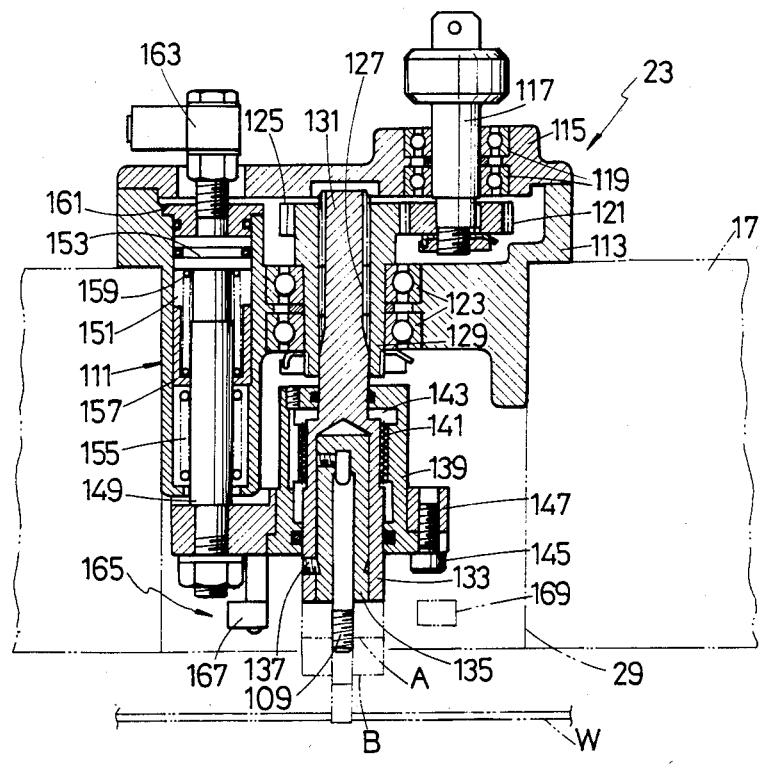
FIG. 4 is an expanded front sectional view of the tapping machine of FIG. 1.

Now referring to FIG. 4, the tapping units 23 comprise a rotating drive system for rotating the taps 109, and an elevating device 111 which moves the taps 109 vertically. To explain in more detail, a casing 113 which forms the tapping unit 23, is formed in a suitable shape to provide parts which can mate with the unit mounting holes 29 in the upper tool support member 17. A cover member 115 is installed on the upper section of this casing 113. A rotating shaft 117, which is connected at the upper edge thereof to the universal joint 107, is removably supported in a freely rotatable manner through a bearing 119 on this cover member 115. A middle gear 121 is integrally mounted on the lower edge of the rotating shaft 117. A driven gear 125 removably supported in a freely rotatable manner close to the central section of the casing 113 engages this middle gear 121 through a bearing 123.

This driven gear 125 is provided with a hollow shaft-shaped section 129 forming a spline 127 inside the driven gear 125. Inside this hollow shaft-shaped section 129, a tap holder shaft 131 is inserted into the spline with free vertical movement. A socket section 133 is formed on the lower part of the tap holder shaft 131. A tap holder 135, which maintains the tap 109, is inserted and secured in a freely mountable and dismountable manner with a set screw 137 in the socket section 133.

The tap holder shaft 131 is guidably supported in a freely removable manner in a tubular holder guide 139. screw section 141 formed at the tap holder shaft 131 engages a holder guide 139. The engaged section is positioned inside an oil bath section 143 formed in the holder guide 139. The pitch of the guide screw section 141 is the same as the pitch of the tap 109. The holder guide 139 is mounted in a freely mountable and dismountable manner on an elevating plate 147 by a plurality of bolts 145. Accordingly, when changing the size of the tap 109, the bolts 145 are loosened, allowing removal and replacement of the holder guide 139 and of the tap holder shaft 131 to be performed very easily.

The elevating plate 147 is integrally mounted on an elevating rod 149 on the elevating device 111. To explain in more detail, a cylinder section 151 is formed in the casing 113, and a piston rod extending down from the piston 153, which is inserted in a freely elevatable manner into this cylinder section 151, is provided as the previously mentioned elevating rod 149. This elevating rod 149 is guided in a freely elevatable manner by a ball bushing 155 inserted into the cylinder section 151. The elevating rod 149 is normally biased in the upper direction by the action of a coil spring 159 which is positioned under tension between the piston 153 and a spring seat 157 loaded on the upper section of the ball bushing 155. A cylinder cap 161 is installed on the upper part of the cylinder section 151. A joint 163 for feeding an operating fluid is connected to the cylinder cap 161. Furthermore, the elevating device 111 for each of tapping units 23 can be individually operated by operating individual switching valves, which are omitted from the drawings.

By this configuration, when the tap drive motor 101 is driven, the rotating shafts 117 for all the tapping units 23 are simultaneously rotated by the drive gears 105 and the universal joints 107. Accordingly, each tap holder shaft 131 is rotated by means of the middle gear 121 and the driven gear 125. Therefore, each tap holder shaft 131 and its tap 109 rotates and descends on the tapping unit 23 through the engaging relationship between the holder guide 139 and the guide screw section 141. Each tap holder shaft 131 and tap 109 etc. rotates uniformly. When, for example, a stroke descends uniformly to position A, the rotation of the tap drive motor 101 is switched, under suitable control, from forward rotation to reverse rotation, and the tap 109 etc. is elevated to return to its original position.

The position A to which the tap 109 etc. descends is a position at a height at which the tap 109 cannot reach the tapping hole, etc., of the workpiece W and the tap 109 is unable to perform the tapping operation. However, prior to actuating tap 109 to descend, on one suitable tapping unit 23, when an operating fluid is fed into the cylinder section 151 of the elevating device 111, the tap holder shaft 131 is caused to descend a large distance by the elevating rod 149, the elevating plate 147, and the holder guide 139. Accordingly, after the tap holder shaft 131 has first been caused to descend by means of the elevating device 111, the tap holder shaft 131 keeps rotating and, as previously outlined, is caused to descend, whereupon the tap holder shaft 131 descends as far as a position B, for example, and the tapping process is carried out on the workpiece W.

Specifically, even in cases where the tapping units 23 are all activated simultaneously by the common tap drive motor 101, only the tap 109 on one suitable tapping unit is used.

A tap detection device 165 is provided on each tapping unit 23 to detect any breakage of the tap 109 after the tapping operation is carried out on the workpiece W by the tap 109 as outlined. This tap detection device 165 detects the presence or absence of the tap 109, and can be constructed, for example, of a light projector 167 and a light receptor 169. The light projector 167 and the light receptor 169 are suitably installed at the lower position of the elevating plate 147 with the tap 109 between them. Accordingly, breakage of the tap 109 can be detected by detecting whether the light from the light projector 167 is received by the light receptor 169.

From the foregoing explanation, it can readily be understood that, by means of the present invention, after positioning the workpiece W and clamping it in the workpiece clamp 63 on the workpiece transfer-and-positioning device 39 and carrying out the forming of tapping hole or the deforming or plunging operation, the tapping operation can be carried out continuously. A plurality of punch units 19 for forming of the tapping hole and punch units 21 for the deforming or plunging operation are provided in parallel, and a striker 73 is provided in a freely movable manner, positionable in the left-right and front-rear directions, for applying force to the punch units 19 and 21. Therefore, a large number of punch units can be positioned in a comparatively small area, and the forming of tapping hole and the deforming or plunging processes can easily be carried out in all sizes and pitches. A dedicated drive motor, which can be a servo-motor, is provided for the tapping operation, so that the operation can be carried out at the optimum rotational speed corresponding to the tap diameter, and stable quality can be obtained. Furthermore, a plurality of tapping units can be driven simultaneously by a common tap drive motor, so that the construction is simplified and cost can be lowered. In addition, the taps on each tapping unit can be lowered individually, and even if the taps on all the tapping units are rotating simultaneously, no problems are produced, and the tapping process can be carried out using any size tap.

Although only preferred emodiments are specifically illustrated and described herein, it will be appreciated that many modifications and variations of the present invention are possible in light of the above teachings and within the purview of the appended claims without departing from the spirit and intended scope of the invention.

What is claimed is:

1. A tapping machine comprising:
   upper and lower frames defining a throat section therebetween;
   a workpiece transfer-and-positioning device for positioning a plate-shaped workpiece in the longitudinal and transverse directions within said throat section;
   an upper tool support member secured to the forward edge of the upper frame;
   a plurality of tapping units supported on said upper frame;
   a plurality of punches disposed in the direction transverse to the longitudinal direction of the upper frame provided on said upper tool support member;
   a plurality of unit mounting holes for said tapping units and a plurality of unit mounting holes for said punches being formed in said upper tool support member;
   said tapping units being inserted as a unit in said plurality of holes for said tapping units and said punches being inserted in said plurality of holes for said punches;
   a first operating means supported on said upper frame connected to said tapping units for providing an operating force for said tapping units;
   a striker supported on the upper frame in a freely positionable manner above said punches for applying an operating force to each punch;
   a second operating means supported on said upper frame connected to said striker for providing an operating force to said striker for applying the operating force to each punch; and
   a plurality of dies each mounted on the front edge of the lower frame in correspondence with each of the punches.

2. The tapping machine of claim 1 wherein said plurality of punches are positioned in a plurality of rows in the longitudinal direction of the upper frame, and wherein the striker is freely movable in the longitudinal direction of the upper frame and in the direction transverse to the longitudinal direction of the upper frame.

3. The tapping machine of claim 2 wherein said plurality of punches are arranged in two rows in the longitudinal direction of the upper frame, one of said rows corresponding to a die for forming a tapping hole and other of said rows corresponding to a die for extruding.

4. The tapping machine of claim 1, wherein said plurality of tapping units are connected to a common driving motor.

5. The tapping machine of claim 4, wherein said plurality of tapping units have an elevating means for moving said tap vertically, respectively.

6. A tapping machine comprising:
   upper and lower frames defining a throat section therebetween:
   a plurality of tapping units provided on the upper frame;
   first operating means provided on said upper frame connected with said tapping units for providing an operating force to said tapping units;
   a plurality of punches provided on said upper frame disposed in the direction transverse to the longitudinal direction of the upper frame;
   second operating means provided on said upper frame connected with said punches for providing an operating force to said punches;
   an upper tool support member secured to the forward edge of the upper frame;
   a plurality of unit mounting holes for said tapping units and a plurality of unit mounting holes for said punches being formed in said upper tool support member;

said tapping units being inserted as a units in said plurality of holes for said tapping units and said punches being inserted in said plurality of holes for said punches;

a workpiece transfer-and-positioning device for positioning a plate-shaped workpiece in the longitudinal and transverse directions within said throat section whereby said workpiece transfer-and-positioning device is adapted to position said plate-shaped workpiece for punching and than continuously for tapping.

7. The tapping machine of claim 6 further comprising means for selecting and operating one of said plurality of tapping units.

8. The tapping machine of claim 7 wherein said means for selecting and operating one of said plurality of tapping units comprises an elevating means for vertically moving the tap of said tapping unit.

9. The tapping machine of claim 8 wherein said plurality of tapping units ar connected to a common drive motor.

10. The tapping machine of claim 9 further comprising a tap holder; a spline shaft in drive engagement with said common motor; and releasable means supported on said spline shaft whereby said tap holder and tap may be removed from said spline shaft.

11. The tapping machine of claim 10 further comprising detecting means disposed in said means for selecting and operating one of said plurality of tapping units for detecting the absence of said tap.

12. A tapping machine comprising:

upper and lower frames defining a throat section therebetween;

a plurality of tapping units provided on the upper frame;

first operating means provided on said upper frame connected with said tapping units for providing an operating force to said tapping units;

a plurality of punches provided on said upper frame disposed in the direction transverse to the longitudinal direction of the upper frame;

second operating means provided on said upper frame connected with said punches for providing an operating force to said punches;

a workpiece transfer-and-positioning device for positioning a plate-shaped workpiece in the longitudinal and transverse directions within said throat section whereby said workpiece transfer-and-positioning device is adapted to position said plate-shaped workpiece for punching and then continuously for tapping, further comprising;

means for selecting and operating one of said plurality of tapping units, wherein;

said tapping units are connected to a common drive motor and said tapping units comprises;

spline shafts vertically inserted in the tapping units at a predetermined position thereof and being in drive engagement with said common motor;

tap holders coaxially fixed to lower ends of said spline shafts and formed with first screw sections on the outer surface of the lower end thereof, the pitch of the first screw sections being the same as that of the taps;

tubular holder guides having second screw sections in an inner peripheral surface thereof and mounted on said tap holders so that the first screw sections engage said second screw sections;

elevating rods vertically inserted in the tapping units in parallel to said spline shafts in such a manner as to longitudinally move up and down, said elevating rods being moved up and down by a hydraulic driving means; and elevating plates connecting lower ends of said elevating rods to said tubular holder guides.

* * * * *

UNITED STATES PATENT AND TRADEMARK OFFICE
CERTIFICATE OF CORRECTION

PATENT NO. : 4,700,441

DATED : October 20, 1987

INVENTOR(S) : HIDEKATSU IKEDA et al

It is certified that error appears in the above-identified patent and that said Letters Patent is hereby corrected as shown below:

IN THE ABSTRACT:

Line 2, "extruding" should be --deforming--.

IN THE SPECIFICATION:

Column 1, second line from bottom, "accomodating" should be --accommodating--;

Column 3, line 33, "fixed" should be --fix--;

lines 35 and 36, delete "Punch unit mounting holes 27, having holes in the workpiece.";

Column 6, line 18, "screw" should be --Screw--;

Column 7, line 58, "emodiments" should be --embodiments--.

IN THE CLAIMS:

Claim 3, Column 8, line 6, "extruding" should be --deforming--.

UNITED STATES PATENT AND TRADEMARK OFFICE
CERTIFICATE OF CORRECTION

PATENT NO. : 4,700,441

DATED : October 20, 1987

INVENTOR(S) : HIDEKATSU IKEDA et al

It is certified that error appears in the above-identified patent and that said Letters Patent is hereby corrected as shown below:

IN THE CLAIMS:

Claim 6, Column 8, line 3, ":" should be --;--;

Column 9, line 3, "units" should be --unit--;

Column 9, line 12, "than" should be --then--.

Claim 9, Column 9, line 2, "ar" should be --are--.

Claim 12, Column 10, line 20, "comprises" should be --comprise--.

Signed and Sealed this

Nineteenth Day of April, 1988

Attest:

DONALD J. QUIGG

Attesting Officer     Commissioner of Patents and Trademarks